United States Patent [19]

Nagasaka et al.

[11] 4,261,036
[45] Apr. 7, 1981

[54] RECEIPT PRINTING TIMING CONTROLLABLE ELECTRONIC CASH REGISTER

[75] Inventors: Takakazu Nagasaka, Nara; Yositaka Fukuma, Yamatokoriyama; Daisuke Mochizuki, Nara, all of Japan

[73] Assignee: Sharp Kabushiki Kaisha, Osaka, Japan

[21] Appl. No.: 20,425

[22] Filed: Mar. 14, 1979

[30] Foreign Application Priority Data

Mar. 14, 1978 [JP] Japan ................... 53-29560

[51] Int. Cl.³ .................. G06F 15/21; G06F 3/12
[52] U.S. Cl. ......................... 364/405; 235/3; 235/60 P
[58] Field of Search ............... 364/405; 235/3, 7 R, 235/58 P, 59 TP, 60 P, 60 AP, 61 PK

[56] References Cited

U.S. PATENT DOCUMENTS

| | | | |
|---|---|---|---|
| 4,095,738 | 6/1978 | Masuo | 364/405 |
| 4,142,235 | 2/1979 | Tadakuma et al. | 364/405 |

Primary Examiner—Jerry Smith
Attorney, Agent, or Firm—Birch, Stewart, Kolasch & Birch

[57] ABSTRACT

An electronic cash register comprises a control switch for allowing and prohibiting printing and issuance of a receipt according to input data introduced by input keys and a delay circuit for deferring operation of the control switch for a predetermined period of time of the actuation of the control switch. The delay circuit provides accurate control for the allowance and prohibition of receipt printing and issuing operation independently of actuation timings when the control switch is energized, thereby preventing random printing and publication of the receipt dependently on the timed relationship of actuation of the control switch.

8 Claims, 3 Drawing Figures

RECEIPT PRINTING TIMING CONTROLLABLE ELECTRONIC CASH REGISTER

BACKGROUND OF THE INVENTION

The present invention relates to an electronic cash register and, more particularly, to a receipt printing controller for use in an electronic cash register for controlling receipt printing and issuing operations.

In the conventional electronic cash register, there were provided means for printing business records on a journal for recording purposes and means for printing and issuing slips of sales to the customers. In some cases there is only the need to make entries on the journal without delivering sales slips to the customers. In such a case, a mechanical or electrical switch was provided for deciding whether the sales slips were to be issued. The mechanical switch comprised a manually operable lever for terminating the slip printing operation and the paper feeding operation, whereas the electrical type switch comprised a manual actuator for turning off and on power supply to printing magnets.

In the case of the electrical switch, the switch was necessarily actuated between the complete termination of the entry of a first group of data and the subsequent introduction of a second group of data. This meant that a timed relationship of operation of the electrical switch should be accurately controlled to inhibit the issuance of defective sales slips.

OBJECTS AND SUMMARY OF THE INVENTION

Accordingly, it is the primary object of the invention to provide and improved electronic cash register having flexibility of operation.

It is a further object of the invention to provide an improved electronic cash register where a complete receipt is printed and issued irrespective of whether a selector is actuated for prohibiting the printing and issuance of sales slips.

It is a further object of the invention to provide a novel controller for use in an electronic cash register for prohibiting receipts from being printed and delivered independently of a prescribed time relationship of operation of the cash register.

It is a further object of the invention to provide an improved electronic cash register where the receipt printing and issuing operation is regulated in a desirable sequence.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to an embodiment of the present invention, an electronic cash register comprises controlling means for allowing and prohibiting the printing and issuance of a sales slip according to input data introduced by an input means and delay means for deferring operation of said controlling means for a predetermined period of time following the actuation of said controlling means.

The controlling means comprise a switch for generating receipt printing control signals. The delay means include an OR gate for receiving at least two series of printing command pulses, an AND gate for receiving output signals developed from the OR gate and the receipt printing control signals generated by the switch, a flip-flop means having output signals developed from the AND gate and printing end pulses, and a control switch responsive to the flip-flop means for controlling power supply from a power source to a magnet for printing characters on the receipt.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
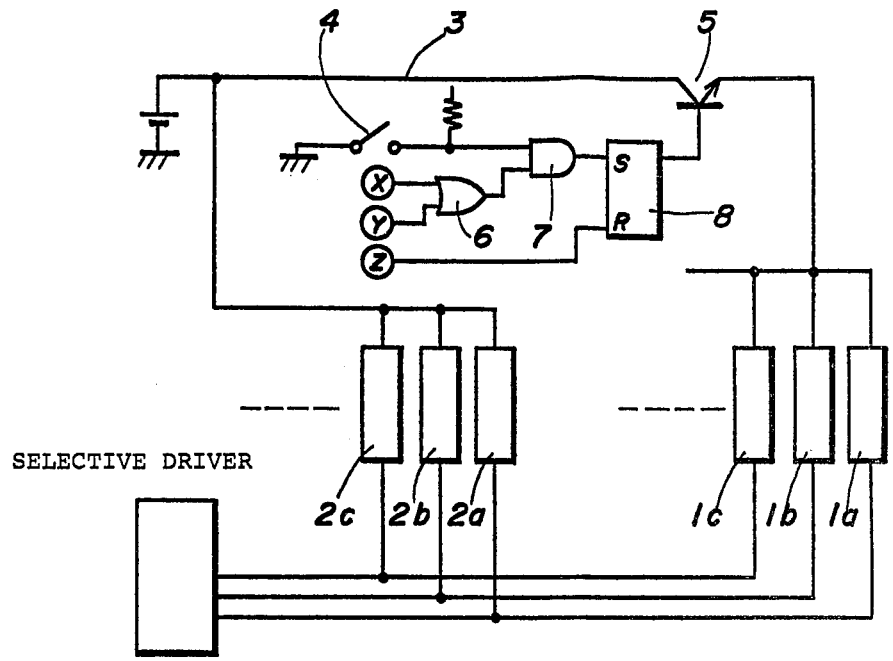
FIG. 1 is a block diagram of a control circuit for use in an electronic cash register according to the present invention.

With reference to FIG. 1, a control circuit comprises receipt printing magnets 1a, 1b, 1c and the like, journal printing magnets 2a, 2b, 2c and the like, a power supply line 3, a selection switch 4, a switching transistor 5, an OR gate 6, an AND gate 7, and a flip-flop 8.

The receipt printing magnets 1a to 1c are provided for selecting printing characters for the receipts, respectively.

Similarly, the journal printing magnets 2a to 2c are employed to select the other printing characters for a journal, respectively. Power supply from a power source to the receipt printing magnets 1a to 1c is conducted through the power supply line 3. The selection switch 4 is actuated for selecting whether or not the receipt is to be printed and issued. During the nonconductive state of the selection switch 4, the receipt is printed and delivered. During the conductive state of the selection switch 4, the printing and issuance of the receipt is prohibited.

The switching transistor 5 is provided for controlling power supply from the power source to the receipt printing magnets 1a to 1c. Printing pulses X are developed for first money data in response to key input means, indicating that the first money data are to be printed in the first line in a receipt. Similarly, printing pulses Y are generated for total data in response to the key input means for commanding that total data are to be printed in the last line in the receipt. The OR gate 6 is responsive to the first money data printing pulses X and the total data printing pulses Y.

The AND gate 7 is responsive to output signals of the OR gate 6 and receipt printing control signals provided by the actuation of the selection switch 4. The flip-flop 8 is caused to be set by the output signals of the AND gate 7 and to be reset by the introduction of printing end pulses Z which are provided in response to the key input means for directing the termination of printing the receipt. Set output signals of the flip-flop 8 are applied to the base of the switching transistor 5.

In operation, assuming that the selection switch 4 is in the nonconductive state and that the AND gate 7 receives the receipt printing control signals which are, e.g., at a high level, or logic "1", the first money data printing pulses X are developed which are, e.g., at a high level, logic "1". The first money data printing pulses X are introduced into the AND gate 7 through the OR gate 6 so that the AND gate 7 becomes conductive. Output signals of the AND gate 7 are applied to a set terminal S of the flip-flop 8, thereby causing the flip-flop 8 to be set. The set output signals developed from the flip-flop 8 are applied to the base of the switching transistor 5.

Therefore, the switching transistor 5 becomes conductive so that the receipt printing magnets 1a to 1c are supplied with power through the power supply line 3 and the switching transistor 5. A selective driver is provided, as is well known, for selecting and energizing the relevant magnets from the receipt printing magnets 1a to 1c. The journal printing magnets 2a to 2c always receive power supply from the power source where the relevant magnets are selectively driven by the selective driver.

After completing the printing and issuance of the receipt and the recording on the journals, the printing end pulses Z are developed which are introduced into a reset terminal R of the flip-flop 8, thereby causing the flip-flop 8 to be reset. The switching transistor 5 is turned off in response to the set state of the flip-flop 8. Power supply to the receipt printing magnets 1a to 1c is prevented and printing and issuance of the receipt is stopped.

Figure 2:
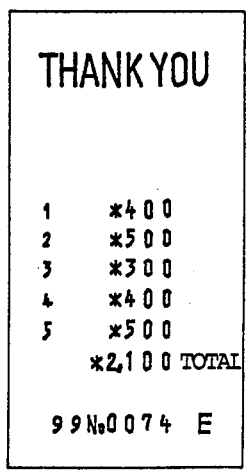
FIGS. 2 and 3 are samples of receipts produced by the control circuit shown in FIG. 1.

While printing and issuance of the receipt is conducted, it is not stopped immediately upon changes of the selection switch 4 from the nonconductive conditions (where the receipt is printed and published) to the conductive conditions, (where the receipt is inhibited from being printed and published). Instead, complete printing and publication of the receipt are accomplished as illustrated, for example, in FIG. 2. Thereafter, the flip-flop 8 accepts the printing end pulses Z, thereby terminating printing and publication of the receipt.

Assuming that the selection switch 4 is actuated in an opposite direction, namely from the nonconductive state, where the receipt is being printed and published, to the conductive state, where the receipt is inhibited from being printed and published. While printing and publication of the receipt are being conducted, any specific type of the receipt is not printed nor published, which is illustrated, for example, in FIG. 3, according to the following control manner.

Under the circumstances where the selection switch 4 is turned on, the AND gate 7 receives the receipt printing control signals applied through the selection switch 4 which are, e.g., at a low level, or logic "0". Therefore, even though the first money data printing pulses X at, e.g., a high level or logic "1" are introduced into the AND gate 7 through the OR gate 6, the output signals of the AND gate 7 are, e.g., in a low level or logic "0".

Therefore, the set output signals developed from the flip-flop 8 are, e.g., in a low level or logic "0" so that the switching transistor 5 remains nonconductive. The receipt printing magnets 1a to 1c remain de-energized and the receipt is completely prevented from being printed and issued.

Upon the selection switch 4 in the nonconductive state, the AND gate 7 is allowed to receive the receipt printing control signals which are, e.g., in a high level, or logic "1". To print the total data in the receipt, the total data printing pulses Y are then generated which are introduced into the AND gate 7 through the OR gate 6. The flip-flop 8 is allowed to be set at this time so that the switching transistor 5 becomes conductive to cause power supply to the receipt printing magnets 1a to 1c.

Figure 3:
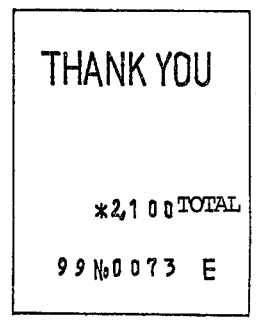

This means that the specific type of receipt where only the total data is printed as shown in FIG. 3 is published under the condition that the selection switch 4 is changed from the nonconductive state, wherein printing and publication of the receipt is being conducted, to the conductive state wherein printing and publication of the receipt are being inhibited.

It will be noted that printing and issuance of the receipt are either allowed or forbidden instantly after the selection switch 4 is actuated from one condition to another under the circumstances where a first receipt has been printed and published but not a second receipt.

While only certain embodiments of the present invention have been described, it will be apparent to those skilled in the art that various changes and modifications may be made therein without departing from the spirit and scope of the invention as claimed.

What is claimed is:

1. An electronic cash register capable of providing a receipt, comprising:
   input means for introducing input data;
   controlling means for permitting and prohibiting the printing and publication of said receipt according to said input data introduced by said input means; and
   delay means for deferring the operation of said controlling means for a predetermined period of time following the actuation of said controlling means.

2. The electronic cash register according to claim 1, wherein said controlling means further comprises switching means for providing receipt printing control signals.

3. The electronic cash register according to claim 2, wherein said input data includes at least two series of printing command pulses; and
   said delay means further includes,
   first gate means for receiving said at least two series of printing command pulses,
   second gate means for receiving output signals developed from said first gate means and said receipt printing control signals generated by said switching means,
   flip-flop means responsive to output signals developed from said second gate means and developing printing end pulses in response thereto, and
   control switch means responsive to said printing end pulses from said flip-flop means for controlling power supply from a power source to means for printing characters on the receipt.

4. The electronic cash register according to claim 3, wherein said at least two series of printing command pulses comprise first printing command pulses generated by said input means for directing that first money data is to be printed on the receipt, and second printing command pulses generated by said input means for directing that total data is to be printed on the receipt.

5. The electronic cash register according to claim 4, wherein said controlling means immediately prohibits the printing and publication of said receipt when said printing control signals are developed, in response to the actuation of said switching means, after the development of said printing end pulses and before the subsequent development of the first printing command pulses.

6. The electronic cash register according to claim 3, wherein said first gate means comprises an OR gate means and said second gate means comprises an AND gate means.

7. The electronic cash register according to claim 3, wherein said control switch means comprises transistor means.

8. The electronic cash register according to claim 2, wherein said switching means develops a first of said receipt printing control signals when placed in a conductive position thereby prohibiting the printing and issuance of said receipt, said switching means developing a second of said receipt printing control signals when placed in a nonconductive position thereby permitting the printing and issuance of said receipt.

* * * * *